(12) United States Patent
Seabaugh et al.

(10) Patent No.: US 7,767,358 B2
(45) Date of Patent: Aug. 3, 2010

(54) SUPPORTED CERAMIC MEMBRANES AND ELECTROCHEMICAL CELLS AND CELL STACKS INCLUDING THE SAME

(75) Inventors: Matthew M. Seabaugh, Columbus, OH (US); Katarzyna Sabolsky, Westerville, OH (US); Edward M. Sabolsky, Westerville, OH (US); Michael J. Day, Dublin, OH (US)

(73) Assignee: NexTech Materials, Ltd., Lewis Center, OH (US)

( * ) Notice: Subject to any disclaimer, the term of this patent is extended or adjusted under 35 U.S.C. 154(b) by 982 days.

(21) Appl. No.: 11/141,259

(22) Filed: May 31, 2005

(65) Prior Publication Data

US 2006/0269813 A1 Nov. 30, 2006

(51) Int. Cl.
*H01M 8/10* (2006.01)
*H01M 6/04* (2006.01)
*H01M 6/18* (2006.01)
*H01M 8/24* (2006.01)

(52) U.S. Cl. ............... 429/483; 429/188; 429/304; 429/452; 429/481; 429/484; 429/491

(58) Field of Classification Search ............ 429/12, 429/30, 33, 38, 40–42, 126–127, 149, 160, 429/188, 304, 321–323; 204/421; 205/200, 205/353, 521, 532; 252/62.2; 427/115; 501/103, 501/104; 29/623.3, 623.5

See application file for complete search history.

(56) References Cited

U.S. PATENT DOCUMENTS

| 6,475,657 | B1 * | 11/2002 | Del Gallo et al. | ............. 429/30 |
| 2004/0021240 | A1 * | 2/2004 | Chen et al. | ................... 264/42 |
| 2004/0219423 | A1 * | 11/2004 | Tunney et al. | ............. 429/127 |

\* cited by examiner

*Primary Examiner*—Patrick Ryan
*Assistant Examiner*—Thomas H. Parsons
(74) *Attorney, Agent, or Firm*—Porter Wright Morris & Arthur LLP

(57) ABSTRACT

A dense ceramic electrolyte membrane supported by symmetrical porous ceramic electrolyte layers. The thin (t<100 microns) electrolyte layer is sandwiched between two fugitive-containing electrolyte support layers that become highly porous after firing. The heat treated fugitive-containing support layers form a skeletal structure of strongly adhered electrolyte with an interpenetrating network of pores that extends well always from the electrolyte surface. The porous layers can be infiltrated with a range of electrode materials or precursors to form a solid oxide fuel cell or other electrochemical cell as well as electrochemical cell stacks. The supported ceramic membrane provides electrochemical performance advantages and reduces warpage during sintering compared to conventional structures.

26 Claims, 5 Drawing Sheets

SUPPORTED CERAMIC MEMBRANES AND ELECTROCHEMICAL CELLS AND CELL STACKS INCLUDING THE SAME

CROSS-REFERENCE TO RELATED APPLICATIONS

Not applicable

STATEMENT REGARDING FEDERALLY SPONSORED RESEARCH

Not applicable

REFERENCE TO MICROFICHE APPENDIX

Not applicable

FIELD OF THE INVENTION

The invention relates to supported thin film membranes of ceramic materials, electrochemical cells including supported thin film membranes, and stacks formed from these electrochemical cells. The symmetrically supported membrane is particularly well suited for subsequent infiltration with electrochemically active species or their precursors (as solutions, slurries, or salts) to enhance chemical or electrical transport to the membrane and provide satisfactory gas flow to the membrane after infiltration. This invention may be useful in electrochemical separations or catalytic reactors including but not limited to solid oxide fuel cells and oxygen separation membranes.

BACKGROUND OF THE INVENTION

To maximize reaction kinetics, ceramic membrane reactors typically are designed to minimize membrane thickness. Reactors are designed with a thin film membrane layer supported by a thicker porous layer that also provides a path for reactant transport to the membrane. The support may be active, meaning it provides electrical conductivity or contains catalytic materials, or passive, meaning it provides only mechanical support. These supported membranes may be prepared by many methods, including chemical and electrochemical vapor deposition, sol-gel coating methods, spray and dip coating of particulate slurries, calendaring of multilayer samples, and screen printing.

Perhaps the most widely used process for producing supported membranes is tape casting, in which a porous-dense bi-layer is fabricated by the lamination of preceramic sheets containing the selected oxide powders, polymeric binders that provide plasticity to the tape, and a pyrolyzable fugitive phase that is incorporated into the support layer to prevent densification. The sheets typically are compressed at temperatures less than 100° C. to produce a laminate structure. The laminate is heated to ~600° C. to remove the binder and fugitive phase, then fired to densify the membrane layer. Tape casting is material insensitive, and supported thin films of membrane material produced by tape casting have been deposited on cathodes, anodes, and inactive substances.

Conventional ceramic electrochemical cell designs are asymmetric in nature. The cells are supported by a thicker electrode, either the anode or the cathode, onto which the thin film is laminated, cast, printed, sprayed, or otherwise deposited. These cell architectures typically experience significant warpage during sintering because the layers sinter differently, with sintering behavior typically being dominated by the thicker electrode. To remediate sintering warpage, a weight may be applied to flatten the cell by creep mechanisms. Alternatively, weights can be applied to the cell during sintering to prevent deformation. Neither approach is desirable. The stresses imposed by the weight(s) typically create defects in the support, the electrolyte, or both.

After the sintering of the electrode-electrolyte bi-layer, the opposite electrode is typically applied to the electrolyte layer. For anode supported cells, this is necessary because the high processing temperatures required to co-sinter the anode and electrolyte preclude the application and sintering of lanthanum perovskite cathodes, which will react to form insulating lanthanum zirconate phases. For cathode supported cells, anode materials typically are applied separately because the lower temperature of the co-sintering process makes NiO/ stabilized zirconia electrolytes difficult to apply. Nickel metal anodes are often used instead, being applied by plasma spray or dip coating and firing in a reducing atmosphere. In both cases, the extra sintering or other process steps add significantly to the cost of the cell.

Electrolyte/electrode interfacial resistance is a major contributor to the electrochemical cell resistance. Composite electrode materials often used to reduce interfacial resistance. Typical composite electrodes consist of an electronically conducting component and an ionically conducting component (often the electrolyte material). The mixed phases sinter to form interpenetrating networks of electronic and ionic conduction paths intertwined with porosity to allow gas diffusion throughout the structure.

A predominant mechanism for reduced interfacial resistance in composite electrodes includes an increase in the three-phase-boundary (tpb) area (i.e. where the electronic conductor, ionic conductor, and the gaseous environment meet the electrolyte). The interpenetrating network of ionic conductor serves as an extension of the electrolyte surface while the network of electronic conductor serves as an extension of the current collector phase. The ionically conducting path must be connected to the electrolyte layer and the electronically conducting path must be connected to the current collector for optimum operation. It therefore is critical that the ionically conducting material be strongly bound to the electrolyte layer of the composite electrode to provide useful area. If this is not the case, the electrochemical reactions are isolated and cannot enhance the transfer of charge.

Achieving adherence between the electrolyte layer and the tonically conducting phase of the composite can require high temperatures that result in detrimental chemical interactions between the electronically conducting phase and the electrolyte. In the nickel oxide-stabilized zirconia anode system, the high co-sintering temperatures required to bond the stabilized zirconia component to the electrolyte layer is benign because there is little interaction or solid solubility between NiO and stabilized $ZrO_2$. However, it is difficult to achieve similar adherence between electrolyte and composite cathodes because of the interaction between stabilized zirconia and perovskite cathodes at high sintering temperatures. In the disclosed invention, this interaction is avoided by the sequential development of a porous electrolyte network that is strongly bound to the electrolyte layer and the subsequent infiltration of electronically conducting phases and precursors to form an electronically conducting phase.

SUMMARY OF THE INVENTION

The present invention provides a supported ceramic membrane in which a dense electrolyte layer is sandwiched by two layers of electrolyte material. This symmetrically supported membrane is particularly well suited for the subsequent infiltration of electrochemically active species or their precursors (as solutions, slurries, or salts) for the enhancement of chemical or electrical transport to the membrane as well as the application of current carrying layers.

In the present invention, the thin (t<100 microns) electrolyte layer in the green state is sandwiched between two green electrolyte support layers that contain a fugitive material. The electrolyte layers may be prepared by tape casting, or alternatively by screen printing or other forming techniques. The membrane and support layers are compressed at temperatures below 100° C. to produce a laminate structure. The laminates are heated to ~600° C. to remove the binder and fugitive phase. After heat treatment, the fugitive-containing electrolyte layers become highly porous. The resultant three-layer, symmetric structure is then sintered at temperatures above 1000° C. to densify the electrolyte layer and provide adherence and cohesion to the outer two porous layers The supported ceramic membrane is suitable for use as an electrochemical cell; when appropriate electrode materials or their precursors are infiltrated into the porosity on each side of the membrane, the cell can be used as a fuel cell, oxygen separator, or other electrochemical device. Electrochemical cells including supported ceramic membranes of the present invention offer advantages in processing and mechanical integrity compared with conventional electrode supported cells. The supported membranes of the present invention also provide a means of translating the advantages of thin electrolytes and intimate interfaces to a robust electrolyte supported design. The all-electrolyte tri-layer laminate structure provides a uniquely flexible platform for the design of a range of electrochemical cells by the selection of appropriate electrode materials or precursor infiltrants. The simple planar geometry of the cell also allows the use of current carrying electrode materials and processes developed for both electrode- and electrolyte-supported cells.

Electrochemical cells formed using the tri-layer structure of the present invention are well suited to the formation of stacks by interleaving cells with dense plates of an electronically conducting material that serves to separate air and fuel streams while providing an electrical series connection between the cells. The tri-layer electrochemical cells offer advantages in stack manufacturing, particularly when the dense plates are formed from a conducting ceramic material such that the cell components and the plates can be sintered together in a single step. Stacks produced in this manner offer high gravimetric and volumetric power densities because thin interconnect plates may be used.

In one preferred embodiment, a supported ceramic membrane comprises a first layer of a fugitive-containing ceramic electrolyte material in the green state; a layer of a dense ceramic electrolyte material in the green state positioned above the fugitive-containing layer; and a second layer of the fugitive-containing ceramic electrolyte material positioned above the dense ceramic electrolyte layer, the tri-layer assembly being laminated and then sintered to form a composite structure, the fugitive-containing ceramic electrolyte layers becoming porous after sintering. The dense ceramic electrolyte layer may have substantially the same thickness as each layer of the porous ceramic electrolyte material formed after sintering.

The dense ceramic electrolyte material and the fugitive-containing ceramic electrolyte material each may be selected from a stabilized zirconia composition, preferably a scandia-doped zirconia composition. The dense ceramic electrolyte material may be a fully stabilized scandia-doped zirconia composition and the fugitive-containing ceramic electrolyte material may be a partially stabilized scandia-doped zirconia composition; alternatively, the dense ceramic electrolyte material may be a partially stabilized scandia-doped zirconia composition and the porous ceramic electrolyte material may be a fully stabilized scandia-doped zirconia composition. The dense ceramic electrolyte material also may be selected from a stabilized zirconia composition and the fugitive containing ceramic electrolyte material may be selected from a stabilized ceria composition. The porous ceramic electrolyte layers formed after sintering may have a pore volume greater than 50% of the total geometric volume; alternatively, the porous ceramic electrolyte layers formed after sintering may have a pore volume greater than 20% and less than 50% of the total geometric volume. The porous ceramic electrolyte material formed after sintering of the fugitive-containing ceramic electrolyte layers may have an average pore size between 100 nanometers and 200 microns.

In another preferred embodiment, a supported ceramic membrane comprises a first outer layer comprising at least one sheet of a fugitive-containing ceramic electrolyte material in the green state; an inner layer comprising at least one sheet of a dense ceramic electrolyte material in the green state; and a second outer layer comprising at least one sheet of the fugitive-containing ceramic electrolyte material, the second outer layer having substantially the same thickness as the first outer layer, the tri-layer assembly being laminated and then sintered to form a composite structure, the fugitive-containing ceramic electrolyte layers becoming porous after sintering. The inner layer of the dense ceramic electrolyte material may have substantially the same thickness as each outer porous layer formed after sintering.

The dense ceramic electrolyte material and the fugitive-containing ceramic electrolyte material each may be selected from a stabilized zirconia composition, preferably a scandia-doped zirconia composition; more preferably, the dense ceramic electrolyte material being a fully stabilized scandia-doped zirconia composition and the fugitive-containing ceramic electrolyte material being a partially stabilized scandia-doped zirconia composition. Alternatively, the dense ceramic electrolyte material may be selected from a stabilized zirconia composition and the fugitive containing material may be selected from a stabilized ceria composition.

In yet another preferred embodiment, a supported ceramic membrane comprises a first outer layer comprising at least one sheet of a fugitive-containing fully stabilized scandia-doped zirconia composition in the green state; an inner layer comprising at least one sheet of a dense fully stabilized ceramic electrolyte material in the green state positioned above the fugitive-containing ceramic electrolyte layer; a second outer layer comprising at least one sheet of a fugitive-containing fully stabilized scandia-doped zirconia composition in the green state positioned above the dense ceramic electrolyte layer with the second outer layer having substantially the same thickness as the first outer layer, the tri-layer assembly being laminated and then sintered to form a composite structure, the fugitive-containing ceramic electrolyte layers becoming porous after sintering, and the porous layers defining pores having an average size between 100 nanometers and 200 microns. The porous layers may have a pore volume greater than 50% of the total geometric volume; alternatively, the porous layers have a pore volume greater than 20% and less than 50% of the total geometric volume.

The present invention also provides an electrochemical cell. In a preferred embodiment, the electrochemical cell comprises a supported ceramic membrane as described above; an anode material deposited on an outer surface of the supported ceramic membrane; and a cathode material deposited on the opposing outer surface of the supported ceramic membrane.

In the above described embodiments, the anode material may be a solution comprising a composition selected from a nickel oxide, a nickel oxide/yttria stabilized-zirconia, a nickel salt, a copper salt, a silver salt, a platinum salt, a gold salt, a doped alkaline earth titanate, a lanthanum chromite, precursors thereof, and mixtures thereof, or a particulate slurry comprising a composition selected from nickel, copper, cobalt, silver, platinum, gold, a nickel alloy, a copper alloy, a silver alloy, a platinum alloy, a gold alloy, a doped alkaline earth titanate, a lanthanum chromite, precursors thereof, and mixtures thereof. The cathode material may be selected from a lanthanum manganite, a doped lanthanum manganite, a lanthanide ferrite, a lanthanide cobaltite, precursors thereof, and mixtures thereof.

The invention also comprises an electrochemical cell stack. In a preferred embodiment, an electrochemical cell stack comprises a first dense electronically conductive plate selected from a nickel chrome superalloy and a ferritic stainless steel; a first electrochemical cell as described above having an outer surface secured to the first conductive plate; a second dense electronically conductive plate secured to the opposing outer surface of the first electrochemical cell; a second electrochemical cell as described above having an outer surface secured to the opposing surface of the second conductive plate; and a third dense electronically conductive plate secured to the opposing outer surface of the second electrochemical cell.

In another preferred embodiment, an electrochemical cell stack comprises n electrochemical cells as described above, wherein $n \geq 2$, and n+1 dense electronically conductive plates each selected from selected from a nickel chrome superalloy and a ferritic stainless steel; each of n−1 plates being secured between the anode surface of one of the n electrochemical cells and the cathode surface of another one of the n electrochemical cells and each of the remaining 2 plates being secured to an outer surface of one of the outermost of the n electrochemical cells.

In yet another preferred embodiment, an electrochemical cell stack comprises a first dense electronically conductive ceramic plate; a first tri-layer assembly comprising a first layer of a fugitive-containing ceramic electrolyte material in the green state having a surface adjacent to the first dense electronically conductive ceramic plate, a layer of a dense ceramic electrolyte material in the green state positioned above the fugitive-containing layer, and a second layer of the fugitive-containing ceramic electrolyte material positioned above the dense ceramic electrolyte material; a second dense electronically conductive ceramic plate adjacent to the second fugitive-containing layer of the tri-layer assembly; a second tri-layer assembly comprising a first layer of a fugitive-containing ceramic electrolyte material in the green state having a surface adjacent to the opposing surface of the second dense electronically conductive ceramic plate, a layer of a dense ceramic electrolyte material in the green state positioned above the fugitive-containing layer, and a second layer of the fugitive-containing ceramic electrolyte material positioned above the dense ceramic electrolyte material; and a third dense electronically conductive ceramic plate adjacent to the second fugitive-containing layer of the second tri-layer assembly, the layered assembly being laminated and then sintered to form a composite structure, the fugitive-containing ceramic electrolyte layers becoming porous after sintering, an anode being applied to alternating porous layers formed after sintering and a cathode being applied to the remaining porous layers.

In still another preferred embodiment, an electrochemical cell stack comprises n tri-layer assemblies wherein $n \geq 2$; each of the tri-layer assemblies comprising a first layer of a fugitive-containing ceramic electrolyte material in the green state, a layer of a dense ceramic electrolyte material in the green state positioned above the fugitive-containing layer, and a second layer of the fugitive-containing ceramic electrolyte material positioned above the dense ceramic electrolyte material; and n+1 dense electronically conductive ceramic plates, each of n−1 plates being secured between the first layer of one of the n tri-layer assemblies and the second layer of one of the n tri-layer assemblies and each of the remaining 2 plates being secured to an outer surface of one of the outermost of the n tri-layer assemblies, the layered assembly being laminated and then sintered to form a composite structure, the fugitive-containing ceramic electrolyte layers becoming porous after sintering, an anode being applied to alternating porous layers formed after sintering and a cathode being applied to the remaining porous layers.

In each of the two preceding embodiments, the anode material may be a solution comprising a composition selected from a nickel oxide, a nickel oxide/yttria stabilized-zirconia, a nickel salt, a copper salt, a silver salt, a platinum salt, a gold salt, a doped alkaline earth titanate, a lanthanum chromite, precursors thereof, and mixtures thereof; or a particulate slurry comprising a composition selected from nickel, copper, cobalt, silver, platinum, gold, a nickel alloy, a copper alloy, a silver alloy, a platinum alloy, a gold alloy, a doped alkaline earth titanate, a lanthanum chromite, precursors thereof, and mixtures thereof. The cathode material may be selected from a lanthanum manganite, a doped lanthanum manganite, a lanthanide ferrite, a lanthanide cobaltite, precursors thereof, and mixtures thereof. Each of the dense electronically conductive ceramic plates may be selected from a lanthanum chromite.

The present invention also provides a method of making a supported ceramic membrane. In a preferred embodiment, the method comprises the steps of providing a first layer comprising at least one sheet of a fugitive-containing ceramic electrolyte material in the green state; positioning a second layer comprising at least one sheet of a dense ceramic electrolyte material in the green state above the fugitive-containing layer; positioning a second layer comprising at least one sheet of a fugitive-containing ceramic electrolyte material in the green state above the dense ceramic electrolyte layer, the second outer layer having substantially the same thickness as the first outer layer; and laminating and then sintering the tri-layer assembly to form a composite structure, the fugitive-containing ceramic electrolyte layers becoming porous after sintering. The method may further comprise the steps of selecting the dense ceramic electrolyte material from a stabilized zirconia composition and selecting the fugitive-containing ceramic electrolyte material from a stabilized zirconia composition and a stabilized ceria composition.

In addition, the present invention provides a method of making an electrochemical cell. In a preferred embodiment, the method comprises the steps of depositing an anode material on an outer surface of a supported ceramic membrane prepared according to the above-described steps and depositing a cathode material on the opposing outer surface of the supported ceramic membrane. The method may further comprises the steps of selecting an anode material from a solution comprising a composition selected from a nickel oxide, a nickel oxide/yttria stabilized-zirconia, a nickel salt, a copper salt, a silver salt, a platinum salt, a gold salt, a doped alkaline earth titanate, a lanthanum chromite, and mixtures thereof, or a particulate slurry comprising a composition selected from nickel, copper, cobalt, silver, platinum, gold, a nickel alloy, a copper alloy, a silver alloy, a platinum alloy, a gold alloy, a doped alkaline earth titanate, a lanthanum chromite, and mixtures thereof; and selecting a cathode material from a lanthanum manganite, a doped lanthanum manganite, a lanthanide ferrite, a lanthanide cobaltite, and mixtures thereof.

The invention also provides a method of making an electrochemical cell stack. In a preferred embodiment, the method comprises the steps of providing n electrochemical cells of claim 20, wherein n≧2; providing n+1 dense electronically conductive plates selected from a nickel chrome superalloy and a ferritic stainless steel; securing each of n−1 plates between the anode surface of one of the n electrochemical cells and the cathode surface of another one of the n electrochemical cells; securing each of the remaining 2 plates to an outer surface of one of the outermost of the n electrochemical cells; and heating the layered assembly to the operating temperature of the electrochemical cells.

In another preferred embodiment, a method of making an electrochemical cell stack comprises the steps of providing n tri-layer assemblies as described above wherein n≧2; providing n+1 dense electronically conductive ceramic plates; securing each of n−1 plates between the first layer of one of the n tri-layer assemblies and the second layer of one of the n tri-layer assemblies; securing each of the remaining 2 plates to an outer surface of one of the outermost of the n tri-layer assemblies; laminating and sintering the layered assembly to form a composite structure, the fugitive-containing ceramic electrolyte layers becoming porous after sintering; applying an anode material to alternating porous layers formed after sintering; and applying a cathode material to the remaining porous layers.

Each of the two preceding method may further comprise the steps of selecting an anode material from a solution comprising a composition selected from a nickel oxide, a nickel oxide/yttria stabilized-zirconia, a nickel salt, a copper salt, a silver salt, a platinum salt, a gold salt, a doped alkaline earth titanate, a lanthanum chromite, precursors thereof, and mixtures thereof, or a particulate slurry comprising a composition selected from nickel, copper, cobalt, silver, platinum, gold, a nickel alloy, a copper alloy, a silver alloy, a platinum alloy, a gold alloy, a doped alkaline earth titanate, a lanthanum chromite, precursors thereof; and mixtures thereof; and selecting a cathode material from a lanthanum manganite, a doped lanthanum manganite, a lanthanide cobaltite, precursors thereof, and mixtures thereof. Each of the dense electronically conductive ceramic plates is selected from a lanthanum chromite.

BRIEF DESCRIPTION OF THE DRAWINGS

These and further objects of the invention will become apparent from the following detailed description.

DETAILED DESCRIPTION OF CERTAIN PREFERRED EMBODIMENTS

Figure 1:
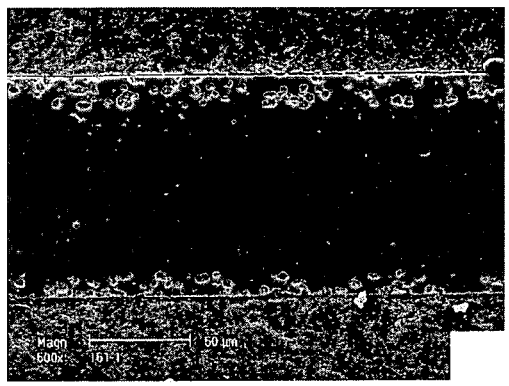
FIG. 1 is an SEM image of a cross section of a symmetrically porous tri-layer prepared using 40% initial fugitive content of fine pore former in the green support layers.

The present invention comprises a dense ceramic electrolyte membrane supported by symmetrical porous ceramic electrolyte layers. High temperature processing of the fugitive-containing support layers results in formation of a skeletal structure of strongly adhered electrolyte with an interpenetrating network of pores that extends well always from the electrolyte surface. The supported ceramic membrane provides electrochemical performance advantages and reduces warpage during sintering compared to conventional structures.

The support microstructure of the ceramic membrane is particularly well suited for high electrochemical activity by the fabrication of highly porous electrochemical layers that are intimately bonded with the electrolyte. Infiltration of electrochemically active species or their precursors (as solutions, slurries, or salts) into the porous regions completes fabrication of the electrochemical layer. Current carrying layers can be applied to the structure by analogous processing steps, or screen printed, spray coated or otherwise applied, making the cell architecture particularly well suited to low-cost scalable manufacturing.

The composition of the dense and porous layers may be selected form a high strength scandia-doped zirconia (fully and partially stabilized), a yttria-doped zirconia (fully and partially stabilized), a doped cerium oxide (including cerium oxide doped with yttrium or one or more lanthanide elements), a doped lanthanum gallate, and a doped bismuth oxide. The support layers may be fabricated using an electrolyte powder of the same composition as the dense layer or a different composition. High strength scandia-doped zirconia compositions are particularly preferred because they allow fabrication of very thin (<50 microns) dense films that are flexible and able to withstand significant deformation before fracture, while simultaneously offering low electrical resistance. The electrolyte thicknesses achievable are of the order of magnitude achieved in conventional electrode supported designs. The mechanical properties of the electrolyte porous layer structures exceed that of competing electrode supported designs Thus, supported ceramic membranes of the present invention combine the electrochemical performance advantages of thin-film electrolyte cells with the mechanical ruggedness of electrolyte supported cells.

The skeletal structure of the electrode can vary in morphology depending upon the electrolyte powder and fugitive powder components selected. The pore size in the porous layers may range from 0.1 microns to 200 microns, depending on the size of the fugitive used to create voids in the structure. The pore volume of the porous layers also may vary, with high pore volume generally being preferred. For example, high pore volume (50-80% pore volume) is desired for gas transport through the layer (with large pore size) and high surface area at electrode/electrolyte interfaces (with smaller pore size), and low pore volume (20-50% pore volume) is desirable when mechanical strength is the primary objective, with gas transport and interfacial activity playing secondary roles.

In addition to the electrochemical advantages of the cell architecture, the proposed path provides a route to cells that can experience significant mechanical strain without failure. The symmetrical porous layers minimize processing stresses because the shrinkage of the porous layers exerts similar stress on each side of the cell.

The composition of the dense and porous layers may be selected from a high strength scandia-doped zirconia (fully and partially stabilized), a yttria-doped zirconia (fully and partially stabilized), a doped cerium oxide (including cerium oxide doped with yttrium or one or more lanthanide elements), a doped lanthanum gallate, and a doped bismuth oxide. High strength scandia-doped zirconia compositions are particularly preferred because they allow fabrication of very thin (<50 micron) dense films that are flexible and able to withstand significant deformation before fracture, while simultaneously offering low electrical resistance.

The electrolyte thicknesses achievable are of the order of magnitude achieved in electrode supported designs. The mechanical properties of the electrolyte/porous layer structures exceed that of competing electrolyte supported designs. Thus, supported ceramic membranes of the present invention combine the electrochemical performance advantages of thin-film electrolyte cells with the mechanical ruggedness of an electrolyte supported structure.

The thickness of the layers in the tri-layer structure may vary depending on the intended end use. It is believed that a tri-layer structure having thinner layers may offer advantages in adapting to conventional designs while a tri-layer structure having thicker layers may offer advantages in manufacturing electrochemical stacks in a single step. screen printed anode and/or cathode layers to fill the porous structures.

A supported ceramic membrane according to the present invention may be prepared by tape casting, as described below. Other preparation methods, such as screen printing, also may yield satisfactory results.

A dense ceramic membrane is fabricated using an electrolyte powder that is tape cast into sheets, then cut to size. Preferably the sheets are 1-100 microns thick. The ceramic electrolyte powder for the support layers is incorporated into a tape casting slurry including a fugitive powder (e.g., rice starch, graphite, or other pyrolyzable compounds) and cast as tape. The tape is cut into sheets and equal numbers of sheets are placed on each side of the electrolyte sheet(s).

The tape stack is laminated to form one solid piece and the laminate is cut to shape. The shapes may be re-laminated to eliminate cutting defects along the edges. The tri-layer samples are heated to 600° C. to burn out binder, then sintered at 1300-1400° C. After sintering, the newly formed pore network in the support layers may be layers with a screen-printing ink, suspension, solution or other precursor to produce interpenetrating networks of electrolyte, electrode and porosity. The precursor is then heat treated to remove solvent, organics, or volatile groups and densify the residual solid component. Additional layers of current collector may be added by screen printing, spray coating, or other techniques known to one skilled in the art.

An outer layer of the tri-layer structure may be infiltrated with an electrochemically active species or precursor to form an anode or a cathode. The infiltrant may be a solution of a salt or organic precursor of at least one electrochemically active species; a particulate slurry of at least one powdered electrochemically active metal or metal oxide, or a mixture of a solution and a slurry of a metal or metal oxide. Infiltration may occur after preparation of individual tri-layer structures or after formation of a stack incorporating multiple tri-layer structures.

Infiltration of one support layer with an anode composition and the opposing support layer with a cathode composition results in an electrochemical cell. Anode materials may be selected from nickel, copper, cobalt, silver, platinum, gold, alloys of these materials, ceramics that exhibit electronic or mixed conductivity in reducing environments including but not limited to doped alkaline earth titanates and lanthanum chromites, mixtures thereof, and precursor infiltrants of any of these materials. Cathode materials may be selected from metals and metal oxides that exhibit electronic or mixed conductivity under oxidizing condition. In particular, cathode materials may be selected from perovskite oxides including but not limited to pure and doped lanthanide manganites, lanthanide ferrites, and lanthanide cobaltites, mixtures thereof, and precursor infiltrants of any of these materials.

Proper materials selection allows anode and cathode to be simultaneously fired to achieve appropriate phase distribution in a single cycle. In particular, this approach is amenable to the use of conventional screen printed anode and/or cathode layers to fill the porous structures.

The tri-layer structure of the present invention also may be used to form electrochemical cell stacks by interleaving two or more of the above-described tri-layer structures or electrochemical cells with dense plates of an electronically conducting material. These plates serve to separate air and fuel streams while providing an electrical series connection between the electrochemical cells. The plates may be formed from a dense material that is conductive in both oxidizing and reducing atmospheres, including but not limited to a lanthanum chromite, a nickel chromic superalloy, and a ferritic stainless steel. When the plates are a dense ceramic material such as lanthanum chromite, the plates can be connected to the tri-layer structure by physically stacking the tri-layer and plate components before sintering; the resultant porous layers can then be infiltrated with electroactive species or precursors to complete preparation of electrochemical cells within the stack. When the plates are a metallic material, they can be connected to a sintered tri-layer electrochemical cell with a contact paste and then heated to the operating temperature of the stack. The contact paste may comprise a conducting ceramic material such as a lanthanum chromite, a cermet such as NiO/YZ, or a metal, such as platinum or silver.

An electrochemical stack may be formed from a minimum of two tri-layer structures or electrochemical cells and three plates, with the first plate having an inner face adjacent to the anode side of the first tri-layer structure or electrochemical cell, the second plate having one face adjacent to the cathode side of the tri-layer structure or electrochemical cell and an opposing face adjacent to the anode side of the second tri-layer structure or electrochemical cell, and the third plate having an inner face adjacent to the cathode side of the second tri-layer structure or electrochemical cell. Additional units may be added to the stack with the number of tri-layer structures electrochemical cells being equal to n and the number of plates being equal to n+1.

Specific examples of the preparation of various tri-layer structures of the present invention are provided below. The term "porous," used to describe tapes or sheets of electrolyte materials in these examples, refers to tapes or sheets containing fugitive materials in the green state that will form the porous layers in the tri-layer structure after heat treatment.

EXAMPLE 1

Symmetrical Structure with Dense Electrolyte Layer and Outer Layers with Low Pore Volume and Fine Pores A tri-layer structure was constructed with cast tapes prepared with scandium stabilized zirconia powder (6ScSZ, Daiichi Kigenso Kagaku Kogyo Co., Ltd. 6Sc1AlSZ). The tape casting slurry for the dense electrolyte tapes was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (15 wt % fish oil in ethanol) (Richard E. Mistler, Inc., DZ3), and 179.04 g 6ScSZ. The bottle was sealed and shaken to mix the ingredients, then placed on a ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistier, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were stacked on top each other, two sheets per stack, and set aside.

The tape casting slurry for the porous tapes was prepared in 500 ml Nalgene bottles. A bottle was filled with 200 g media (5 mm diameter, zirconia), 42 g solvent (1:1 ratio of xylene and ethanol, GFS Chemicals), 2.08 g diluted Blown Menhaden Fish Oil dispersant (15 wt % fish oil in ethanol) (Richard E. Mistler, Inc., DZ3), 5.64 g rice starch (Sigma) and 54.21 g 6ScSZ powder. The bottle was sealed and shaken to mix the ingredients, then placed on a ball mill for 4 hours. After 4 hours of milling, the bottle was removed and 3.92 g poly (butylbenzyl phthalate) (Richard E. Mistler, Inc., PBBP), 3.92 g poly(alkylene glycol) (Richard E. Mistler, Inc., PPAG), and 8.22 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 28 µm. The tape was cut into 15×15 cm sheets.

Figure 2:
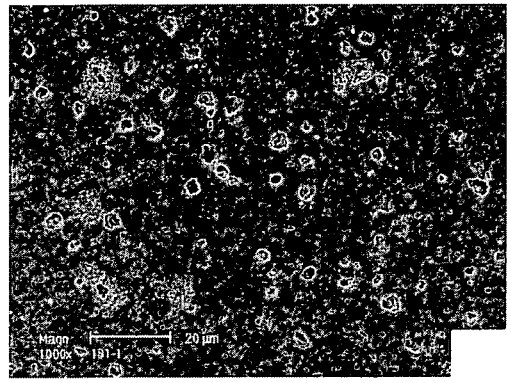
FIG. 2 is an SEM image of a top view of the symmetrically porous tri-layer of FIG. 1.

A single sheet of porous tape was placed on the top and bottom of the 2-sheet stack of dense electrolyte tape. The resulting porous/dense/porous stack was laminated in an isostatic laminator (Flow Autoclave Systems, Inc., LIL81005-SS) at 80° C. and 96 MPa. The laminate was then cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 1 and 2.

EXAMPLE 2

Symmetrical Structure with Dense Electrolyte Layer and Outer Layers with High Pore Volume and Fine Pores A tri-layer structure was constructed with cast tapes prepared with scandium stabilized zirconia powder (6ScSZ, Daiichi Kigenso Kagaku Kogyo Co., Ltd. 6Sc1AlSZ). The tape casting slurry for the dense electrolyte tapes was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (15 wt % fish oil in ethanol) (Richard E. Mistler, Inc., DZ3), and 179.04 g 6ScSZ powder. The bottle was sealed and shaken to mix the ingredients, then placed on a ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were stacked on top each other, two sheets per stack, and set aside.

The tape casting slurry for the porous tapes was prepared in 500 ml Nalgene bottles. A bottle was filled with 200 g media (5 mm diameter, zirconia), 79.75 g solvent (1:1 ratio of xylene and ethanol, GFS Chemicals), 3.10 g diluted Blown Menhaden Fish Oil dispersant (15 wt % fish oil in ethanol) (Richard E. Mistler, Inc., DZ3), 13.67 g rice starch (Sigma) and 47.14 g 6ScSZ powder were added. The bottle was sealed and shaken to mix the ingredients, then placed on a ball mill for 4 hours. After 4 hours of milling, the bottle was removed and 1.55 g poly(butylbenzyl phthalate) (Richard E. Mistler, Inc., PBBP), 1.55 g poly(alkylene glycol) (Richard E. Mistler, Inc., PPAG), and 3.25 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 50 µm. The tape was cut into 15×15 cm sheets.

Figure 3:
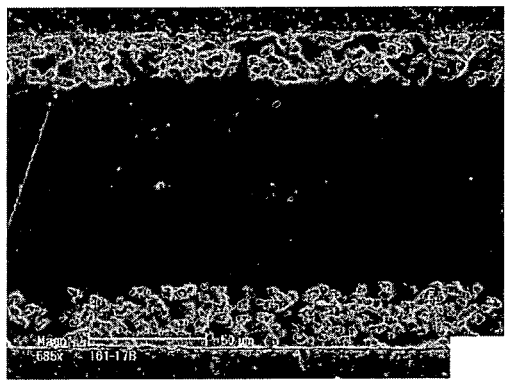
FIG. 3 is an SEM image of a cross section of a symmetrically porous tri-layer prepared with 65% initial fugitive content of fine pore former in the green support layer.
Figure 4:
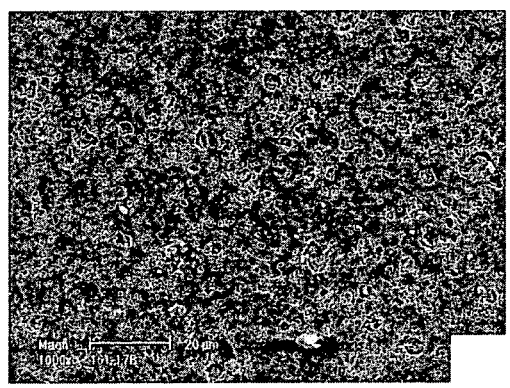
FIG. 4 is an SEM image of a top view of the symmetrically porous tri-layer of FIG. 3.

A single sheet of porous tape was placed on the top and bottom of the 2-sheet stack of dense electrolyte tape. The resulting porous/dense/porous stack was laminated in an isostatic laminator (Flow Autoclave Systems, Inc., LIL81005-SS) at 80° C. and 96 MPa. The laminate was then cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 3 and 4.

EXAMPLE 3

Symmetrical Structure with Thin Dense Electrolyte Layer and Outer Layers with High Pore Volume and Fine Pores A tri-layer structure was constructed with cast tapes prepared with scandium stabilized zirconia powder (6ScSZ, Daiichi Kigenso Kagaku Kogyo Co., Ltd. 6Sc1AlSZ). The tape casting slurry for the dense electrolyte tapes was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (15 wt % fish oil in ethanol) (Richard E. Mistler, Inc., DZ3), and 179.04 g 6ScSZ powder. The bottle was sealed and shaken to mix the ingredients, then placed on a ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were set aside.

The tape casting slurry for the porous tapes was prepared in 500 ml Nalgene bottles. A bottle was filled with 200 g media (5 mm diameter, zirconia), 79.75 g solvent (1:1 ratio of xylene and ethanol, GFS Chemicals), 3.10 g diluted Blown Menhaden Fish Oil dispersant (15 wt % fish oil in ethanol) (Richard E. Mistler, Inc., DZ3), 13.67 g rice starch (Sigma) and 47.14 g 6ScSZ powder were added. The bottle was resealed and shaken to mix the ingredients, then placed on a ball mill for 4 hours. After 4 hours of milling, the bottle was removed and 1.55 g poly(butylbenzyl phthalate) (Richard E. Mistler, Inc., PBBP), 1.55 g poly(alkylene glycol) (Richard E. Mistler, Inc., PPAG), and 3.25 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 35 µm. The tape was cut into 15×15 cm sheets.

Figure 5:
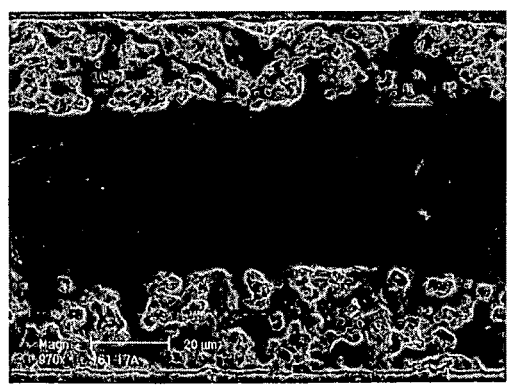
FIG. 5 is an SEM image of a cross section of a symmetrically porous tri-layer prepared using 65% initial fugitive content in the green support layers and a single-layer dense electrolyte.
Figure 6:
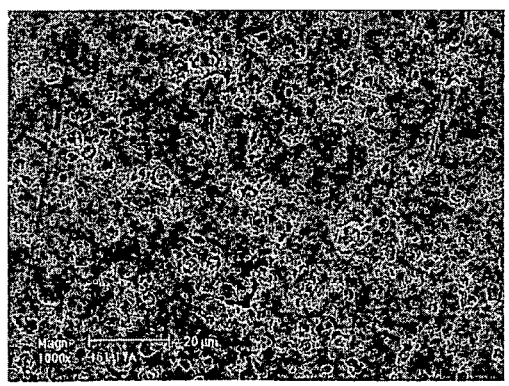
FIG. 6 is an SEM image of a top view of the symmetrically porous tri-layer of FIG. 5.

A single sheets of porous tape was placed on the top and bottom of a single sheet of dense electrolyte tape. The resulting porous/dense/porous stack was laminated in an isostatic laminator (Flow Autoclave Systems, Inc., LIL81005-SS) at 80° C. and 96 MPa. The laminate was then cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 5 and 6.

EXAMPLE 4

Symmetrical Structure with Dense Electrolyte and Outer Layers of Differing Composition with High Pore Volume and Fine Pores The porous electrolyte tapes were prepared with 10 mol % scandia-stabilized zirconia powder (10ScSZ, Daiichi Kigenso Kagaku Kogyo Co., Ltd. 10Sc1AlSZ). The dense electrolyte tapes were prepared with 6 mol % scandia-stabilized zirconia powder (6ScSZ, Daiichi Kigenso Kagaku Kogyo Co., Ltd. 6Sc1AlSZ). The porous electrolyte tapes were prepared in 500 ml Nalgene bottles. The bottle was filled with 300 g media (5 mm diameter, zirconia), 65.71 g solvent (1:1 ratio of xylene and ethanol, GFS Chemicals), 5.46 g diluted Blown Menhaden Fish Oil dispersant (Richard E. Mistler, Inc., DZ3) (15 wt % fish oil in a 1:1 ratio of xylene and ethanol), 80.76 g 10ScSZ powder, and 13.34 g rice starch (Sigma-Aldrich). The bottle was sealed and shaken to mix the ingredients, then placed on a fast ball mill for 4 hours. After 4 hours of milling, the bottle was removed and 2.72 g poly (butylbenzyl phthalate) (Richard E. Mistler, Inc., PBBP), 2.72 g poly(alkylene glycol) (Richard E. Mistler, Inc., PPAG), and 5.72 g poly(vinyl butyral) (Richard E. Mistler Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 42 µm. The tape was cut into 15×15 cm sheets and set aside.

The dense electrolyte tapes were prepared in 500 ml Nalgene bottles. The bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly (butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 55 µm. The tape was cut into 15×15 cm sheets and set aside.

One 15×15 cm sheet of porous 10ScSZ was placed on a piece of silicon-coated Mylar covering an aluminum lamination plate. Two 15×15 cm sheets of dense 6ScSZ were placed on top of the 10ScSZ sheet. Finally, one sheet of porous 10ScSZ was placed on top of the other three sheets and covered with one piece of silicon-coated Mylar (Richard E. Mistler, Inc., G10JRM). The resulting 10ScSZ/6ScSZ/6ScSZ/10ScSZ stack was sealed in heat sealable bags (Kapak Corp.) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300).

The circles were placed on porous setters (Seelee, Micromass). The setters with the laminates were then placed in a high temperature furnace (Carbolite, Inc., RHF 15/35) for binder burnout and sintering.

EXAMPLE 5

Symmetrical Structure with Dense Electrolyte and Outer Layers with Differing Composition, High Pore Volume and Coarse Pores The tri-layers were constructed with cast tapes prepared with yttrium stabilized zirconia and scandium stabilized zirconia powders (YSZ, Unitec Ceramics, initial SSA=1.300 m$^2$/g and 6ScSZ, Daiichi Kigenso Kagaku Kogyo Co., Ltd. 6Sc1AlSZ, initial SSA=8.704 m$^2$/g). The dense electrolyte tapes were prepared in 500 ml Nalgene bottles. A bottle was filled with 300 g media (5 mm diameter, zirconia), 100.20 g solvent (1:1 ratio of xylene and ethanol, GFS Chemicals), 2.77 g KD-1 dispersant (Uniqema, Hypermer KD-1), and 187.50 g 6ScSZ powder. The bottle was sealed and shaken to mix the ingredients, then placed on a ball mill for 4 hours. After 4 hours of milling, the bottle was removed and the slurry was separated from the media and strained through 400-mesh screen. The strained slurry was poured into a new 500 ml Nalgene bottle with 300 g media and 6.27 g poly(butylbenzyl phthalate) (Richard E. Mistler, Inc., PBBP), 6.27 g poly(alkylene glycol) (Richard E. Mistler, Inc., PPAG), and 13.19 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were stacked on top each other, two sheets per stack, and set aside.

The porous tapes of YSZ were prepared in 500 ml Nalgene bottles. A bottle was filled with 200 g media (5 mm diameter, zirconia), 81.35 g solvent (1:1 ratio of xylene and ethanol, GFS Chemicals), 1.78 g KD-1 dispersant (Uniqema, Hypermer KD-1), 34.17 g Pure-Dent (Grain Processing Corp., Pure-Dent B850), and 158.76 g YSZ powder. The bottle was sealed and shaken to mix the ingredients, then placed on a ball mill for 4 hours. After 4 hours of milling, the bottle was removed and 5.99 g poly(butylbenzyl phthalate) (Richard E. Mistler, Inc., PBBP), 5.99 g poly(alkylene glycol) (Richard E. Mistler, Inc., PPAG), and 11.97 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 85 µm. The tape was cut into 15×15 cm sheets.

Figure 7:
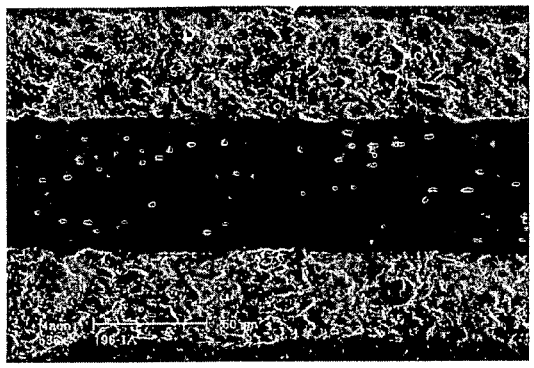
FIG. 7 is an SEM image of a cross section of a symmetrically porous tri-layer prepared using 10ScSZ and 50% initial fugitive content of fine pore former in the green support layers.
Figure 8:
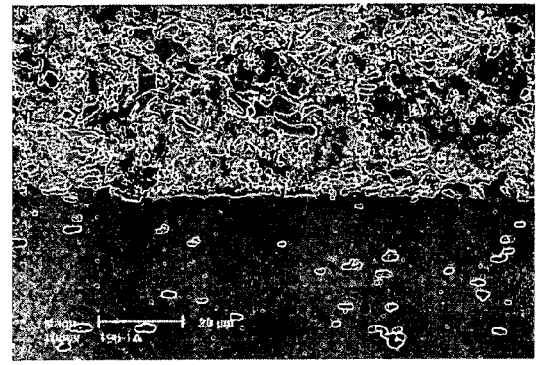
FIG. 8 is a high magnification backscatter SEM image of the sample of FIG. 7.

A single sheet of porous YSZ tape was placed on the top and bottom of a 2-sheet stack of dense 6ScSZ electrolyte tape. The resulting porous/dense/porous stack was laminated in an isostatic laminator (Flow Autoclave Systems, Inc., LIL81005-SS) at 80° C. and 96 MPa. The laminate was then taken out and cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 7 and 8.

EXAMPLE 6

Symmetrical Structure with Dense Electrolyte and Outer Layers with High Pore Volume and Coarse Pores The tri-layers were constructed with cast tapes prepared with scandium stabilized zirconia powder (6ScSZ, Daiichi Kigenso Kagaku Kogyo Co., Ltd. 6Sc1AlSZ, initial SSA=8.704 m$^2$/g). The dense electrolyte tapes were prepared in 500 ml Nalgene bottles. A bottle was filled with 300 g media (5 mm diameter, zirconia), 100.20 g solvent (1:1 ratio of xylene and ethanol, GFS Chemicals), 2.77 g KD-1 dispersant (Uniqema, Hypermer KD-1), and 187.50 g 6ScSZ powder. The bottle was sealed and shaken to mix the ingredients, then placed on a ball mill for 4 hours. After 4 hours of milling, the bottle was removed and the slurry was separated from the media and strained through 400-mesh screen. The strained slurry was poured into a new 500 ml Nalgene bottle with 300 g media and 6.27 g poly(butylbenzyl phthalate) (Richard E. Mistler, Inc., PBBP), 6.27 g poly(alkylene glycol) (Richard E. Mistler, Inc., PPAG), and 13.19 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were stacked on top each other, two sheets per stack, and set aside.

The porous tapes of 6ScSZ were prepared in 500 ml Nalgene bottles. A bottle was filled with 200 g media (5 mm diameter, zirconia), 95.16 g solvent (1:1 ratio of xylene and ethanol, GFS Chemicals), 2.08 g diluted Blown Menhaden Fish Oil dispersant (Uniqema, Hypermer KD-1), 39.98 g Pure-Dent modified starch (Grain Processing Corp., Pure-Dent B850) and 184.77 g 6ScSZ powder. The bottle was sealed and shaken to mix the ingredients, then placed on a ball mill for 4 hours. After 4 hours of milling, the bottle was removed and 7.00 g poly(butylbenzyl phthalate) (Richard E. Mistler, Inc., PBBP), 7.00 g poly(alkylene glycol) (Richard E. Mistler, Inc., PPAG), and 14.01 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 52 µm. The tape was cut into 15×15 cm sheets.

Figure 9:
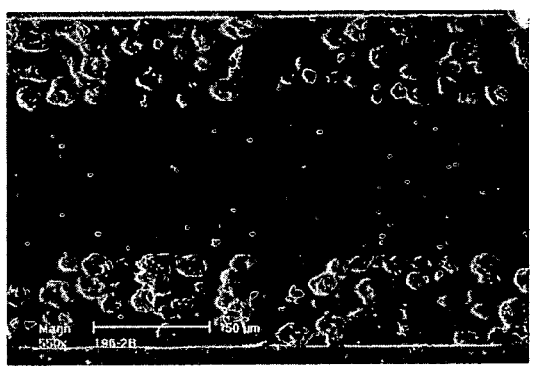
FIG. 9 is an SEM image of a cross section of a symmetrically porous tri-layer prepared using 50% initial fugitive content of coarse pore former in the green support layers.
Figure 10:
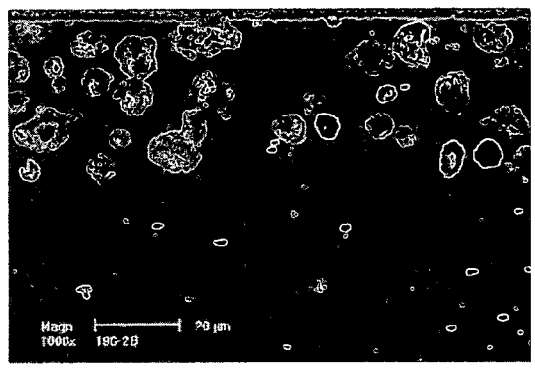
FIG. 10 is a high magnification backscatter SEM image of the sample of FIG. 9.

A single sheet of porous tape was placed on the top and bottom of a 2-sheet stack of dense electrolyte tape. The resulting porous/dense/porous stack was laminated in an isostatic laminator (Flow Autoclave Systems, Inc., LIL81005-SS) at 80° C. and 96 MPa. The laminate was then taken out and cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 9 and 10.

EXAMPLE 7

Symmetrical Structure with Thin Dense Electrolyte and Thick Outer Layers of Differing Composition with High Pore Volume and Coarse Pores The tri-layers were constructed with cast tapes prepared with yttrium stabilized zirconia and scandium stabilized zirconia powders (YSZ, Unitec Ceramics, initial SSA=1.300 $m^2/g$ and 6ScSZ, Daiichi Kigenso Kagaku Kogyo Co., Ltd. 6Sc1AlSZ, initial SSA=8.704 $m^2/g$). The dense electrolyte tapes were prepared in 500 ml Nalgene bottles. A bottle was filled with 300 g media (5 mm diameter, zirconia), 100.20 g solvent (1:1 ratio of xylene and ethanol, GFS Chemicals), 2.77 g KD-1 dispersant (Uniqema, Hypermer KD-1), and 187.50 g 6ScSZ powder. The bottle was sealed and shaken to mix the ingredients, then placed on a ball mill for 4 hours. After 4 hours of milling, the bottle was removed and the slurry was separated from the media and strained through 400-mesh screen. The strained slurry was poured into a new 500 ml Nalgene bottle with 300 g media and 6.27 g poly(butylbenzyl phthalate) (Richard E. Mistler, Inc., PBBP), 6.27 g poly(alkylene glycol) (Richard E. Mistler, Inc., PPAG), and 13.19 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were set aside.

The porous tapes of YSZ were prepared in 500 ml Nalgene bottles. A bottle was filled with 200 g media (5 mm diameter, zirconia), 81.35 g solvent (1:1 ratio of xylene and ethanol, GFS Chemicals), 1.78 g KD-1 dispersant (Uniqema, Hypermer KD-1), 34.17 g Pure-Dent (Grain Processing Corp., Pure-Dent B850) and 158.76 g YSZ powder. The bottle was sealed and shaken to mix the ingredients, then placed on a ball mill for 4 hours. After 4 hours of milling, the bottle was removed and 5.99 g poly(butylbenzyl phthalate) (Richard E. Mistler, Inc., PBBP), 5.99 g poly(alkylene glycol) (Richard E. Mistler, Inc., PPAG), and 11.97 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 85 µm. The tape was cut into 15×15 cm sheets.

Figure 11:
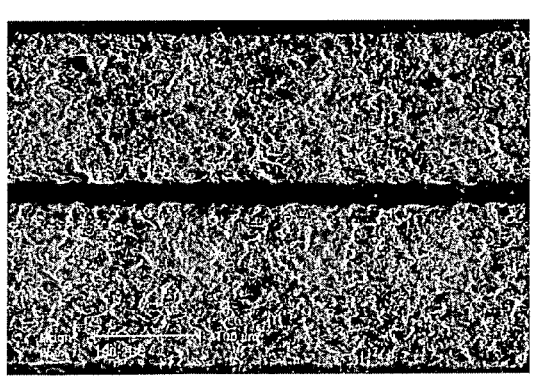
FIG. 11 is an SEM image of a cross section of a symmetrically porous tri-layer prepared using 50% initial fugitive content of coarse pore former in the green YSZ support layers.
Figure 12:
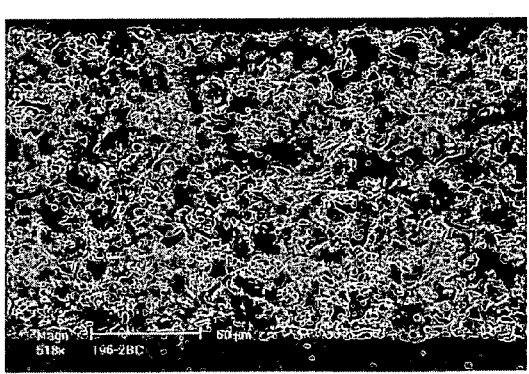
FIG. 12 is a high magnification backscatter SEM image of the sample of FIG. 11.

Four sheets of porous YSZ tape were placed on the top and bottom of a single sheet of dense ScSZ electrolyte tape. The resulting porous/dense/porous stack was laminated in an isostatic laminator (Flow Autoclave Systems, Inc., LIL81005-SS) at 80° C. and 96 MPa. The laminate was then taken out and cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 11 and 12.

EXAMPLE 8

Symmetrical Structure with Thin Dense Electrolyte with Thick Outer Layers with High Pore Volume and Coarse Pores The tri-layers were constructed with cast tapes prepared with scandium stabilized zirconia powder (6ScSZ, Daiichi Kigenso Kagaku Kogyo Co., Ltd. 6Sc1AlSZ, initial SSA=8.704 $m^2/g$). The dense electrolyte tapes were prepared in 500 ml Nalgene bottles. A bottle was filled with 300 g media (5 mm diameter, zirconia), 100.20 solvent (1:1 ratio of xylene and ethanol, GFS Chemicals), 2.77 g KD-1 dispersant (Uniqema, Hypermer KD-1), and 187.50 g 6ScSZ powder. The bottle was sealed and shaken to mix the ingredients, then placed on a ball mill for 4 hours. After 4 hours of milling, the bottle was removed and the slurry was separated from the media and strained through 400-mesh screen. The strained slurry was poured into a new 500 ml Nalgene bottle with 300 g media and 6.27 g poly(butylbenzyl phthalate) (Richard E. Mistler, Inc., PBBP), 6.27 g poly(alkylene glycol) (Richard E. Mistler, Inc., PPAG), and 13.19 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. The slurry was cast onto silicon-coated Mylar. The thickness of the dry tape was 50 µm. The tape was cut into 15×15 cm sheets. The sheets were set aside.

The porous tapes of 6ScSZ were prepared in 500 ml Nalgene bottles. A bottle was filled with 200 g media (5 mm diameter, zirconia), 95.16 g solvent (1:1 ratio of xylene and ethanol, GFS Chemicals), 2.08 g diluted Blown Menhaden Fish Oil dispersant (Uniqema, Hypermer KD-1), 39.98 g Pure-Dent modified starch (Grain Processing Corp., Pure-Dent B850) and 184.77 g 6ScSZ powder. The bottle was sealed and shaken to mix the ingredients, then placed on a ball mill for 4 hours. After 4 hours of milling, the bottle was removed and 7.00 g poly(butylbenzyl phthalate) (Richard E. Mistler, Inc., PBBP), 7.00 g poly(alkylene glycol) (Richard E. Mistler, Inc., PPAG), and 14.01 g poly(vinyl butyral) (Richard E. Mistler, Inc., B-98) were added. The bottle was resealed and replaced on the mill for 12 hours. The milled slurry was decanted into a 250 ml Nalgene bottle and placed on a slow mill for one hour to de-air. After de-airing, the slurry was cast onto silicon coated Mylar. The thickness of the dry tape was 52 µm. The tape was cut into 15×15 cm sheets.

Figure 13:
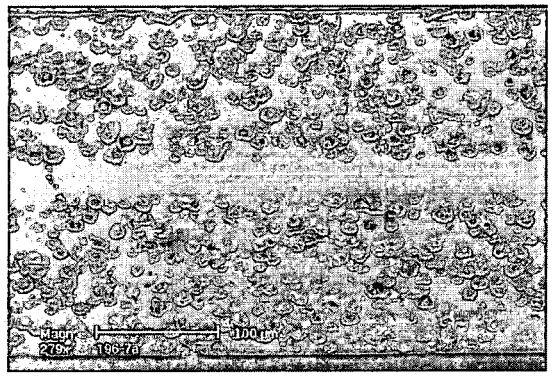
FIG. 13 is an SEM image of a cross section of a symmetrically porous tri-layer prepared using 50% initial fugitive content of coarse pore former in the thick green support layers.
Figure 14:
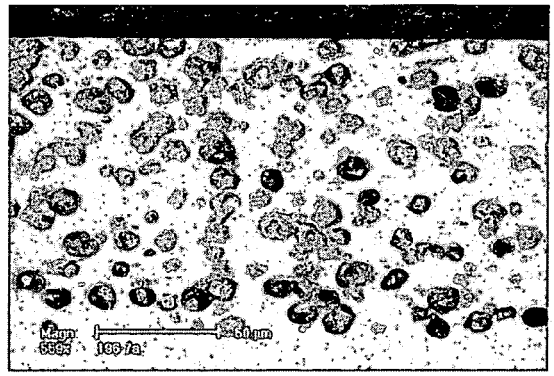
FIG. 14 is a high magnification backscatter SEM image of the sample of FIG. 13.
Figure 15:
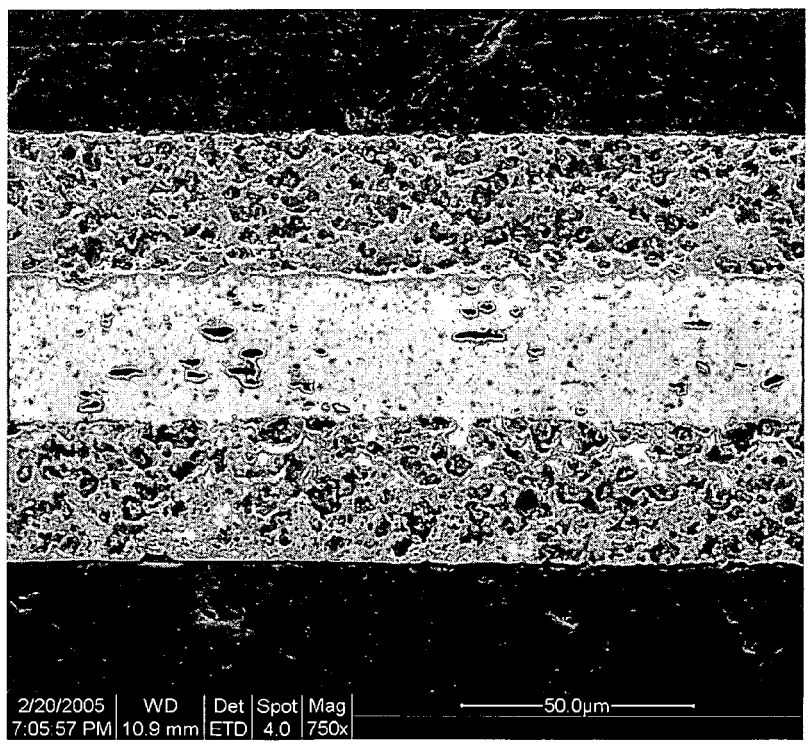
FIG. 15 is an SEM image of a cross section of the symmetrically porous tri-layer of Example 9.

Four sheets of porous tape were placed on the top and bottom of a single sheet of dense electrolyte tape. The resulting porous/dense/porous stack was laminated in an isostatic laminator (Flow Autoclave Systems, Inc., LIL81005-SS) at 80° C. and 96 MPa. The laminate was then taken out and cut into 2.5 cm diameter circles using a laser cutting system (Universal Laser System, Inc., M-300). The circles were placed on porous setters (Seelee, Micromass). The setters with the laminates were then placed in a furnace (Carbolite, Inc., RHF 15/35) for binder burnout and sintering to 1350° C. The sintered samples were evaluated by SEM, as shown in FIGS. 13 and 14.

EXAMPLE 9

Symmetrical Structure with Dense Electrolyte and Outer Layers of Differing Composition with High Pore Volume and Fine Pores The porous electrolyte tapes were prepared with 10 mol % gadolinium-doped ceria powder (GDC, Fuel Cell Materials)

calcined at 1000° C. The dense electrolyte tapes were prepared with 6 mol % scandia-stabilized zirconia powder (6ScSZ, Daiichi Kigenso Kagaku Kogyo Co., Ltd. 6Sc1AlSZ). The slurry for the porous electrolyte tapes was prepared in a 500 ml Nalgene bottle. A bottle was filled with 300 g media (5 mm diameter, zirconia), 95.87 g solvent (1:1 ratio of xylene and ethanol, GFS Chemicals), 8.49 g diluted Blown Menhaden Fish Oil dispersant (Richard E. Mistler, Inc., DZ3) (15 wt % fish oil in a 1:1 ratio of xylene and ethanol), 158.43 g GDC powder, and 19.83 g rice starch (Sigma-Aldrich). The bottle was sealed and shaken to mix the ingredients, then placed on a fast ball mill for 4 hours. After 4 hours of milling, the bottle was removed and 4.24 g poly(butylbenzyl phthalate) (Richard E. Mistler, Inc., PBBP), 4.24 g poly(alkylene glycol) (Richard E. Mistler, Inc., PPAG), and 8.90 g poly(vinyl butyral) (Richard E. Mistler Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 54 μm. The tape was cut into 15×15 cm sheets and set aside.

The slurry for the dense electrolyte tapes were prepared in a 500 ml Nalgene bottle. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 45 μm. The tape was cut into 15×15 cm sheets and set aside.

One 15×15 cm sheet of porous GDC was placed on a piece of silicon-coated Mylar covering an aluminum lamination plate. One 15×15 cm sheet of dense 6ScSZ was placed on top of the GDC sheet. Finally, one sheet of porous GDC was placed on top of the other two sheets and covered with one piece of silicon-coated Mylar (Richard E. Mistler, Inc., G10JRM). The resulting GDC/6ScSZ/GDC stack was sealed in heat sealable bags (Kapak Corp.) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering.

COMPARATIVE EXAMPLE

Symmetrical Structure with Thin Dense Electrolyte and Dense Outer Layers of Different Composition Dense electrolyte tapes were prepared using 10 mol % scandia-stabilized zirconia powder (10ScSZ, Daiichi Kigenso Kaguku Kogyo Co., Ltd. 10Sc1AlSZ). The tape slurry for the dense 10ScSZ tapes was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 10ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E, Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc. G10JRM). The thickness of the dry tape was 70 μm. The tape was cut into 15×15 cm sheets and set aside.

Dense electrolyte tapes were prepared using 6 mol % scandia-stabilized zirconia powder (6ScSZ, Daiichi Kigenso Kaguku Kogyo Co., Ltd. 6Sc1AlSZ). The tape slurry for the dense 6ScSZ tapes was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 40 μm. The tape was cut into 15×15 cm sheets and set aside.

One 15×15 cm sheet of dense 10ScSZ was placed on a piece of silicon-coated Mylar covering an aluminum lamination plate. Two 15×15 cm sheets of dense 6ScSZ were placed on top of the 10ScSZ. Finally, one sheet of dense 10ScSZ was placed on top of the other three sheets and covered with one piece of silicon-coated Mylar. The resulting 10ScSZ/6ScSZ/6ScSZ/10ScSZ stack was sealed in heat sealable bags (Kapak Corp., model 505) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering.

The mechanical strength of substrates from Examples 2 and 4 and the comparative example were tested using ASTM Standard Test Method C 1499. Table 1 compares the strength of these multi-layer electrolyte structures to conventional substrates of 8 mol % yttria-stabilized zirconia, 6 mol % scandia-stabilized zirconia, and 10 mol % scandia-stabilized zirconia of equivalent thicknesses.

TABLE I

Mechanical Properties of Various Zirconia-Based Electrolyte Components

| Specimen Index Description | 8 YSZ | 6 ScSZ | 10 ScSZ | Comparative Example 10d/6d, 6d/10d | Example 2 6p/6d, 6d/6p | Example 4 10p/6d, 6d/10p |
| --- | --- | --- | --- | --- | --- | --- |
| Average strength (MPa) and 95% confident interval | 187.1 ± 44.9 | 670.1 ± 280.2 | 310.0 ± 148.1 | 5 | 5 | 4 |
| Weibull characteristic strength (MPa) | 197 | 733.5 | 343.4 | 528.8 ± 174.3 | 411.5 ± 150.9 | 326.0 ± 60.7 |
| Weibull modulus | 9 | 4.74 | 3.97 | 25.22 | 7.28 | 8.31 |

The data show that the substrates of Examples 2 and 4 demonstrate good mechanical strength compared to pure YSZ and 10ScSZ laminates of the same composition. Although the strengths of Examples 2 and 4 are lower than the dense comparative sample, the electrolyte thickness is reduced from 150 microns to 85 microns, which would reduce the resistance of the electrolyte by nearly half. The comparative example, in which the 10ScSZ in the outside layer is dense, has a strength intermediate between the pure 10 and 6 mol % Sc doped zirconia.

EXAMPLE 10

Electrochemical Cell Using Tri-Layer Structure of Example 3

An anode electrode was first prepared using a supported ceramic membrane according to the present invention. A black nickel oxide suspension was prepared from black nickel oxide (Novamet, Grade A) with surface area of 78.313 $m^2/g$ was attrition milled for four hours in isopropanol. The milled slurry was emptied into a 2 l Nalgene bottle. To obtain fine particle size fraction, the attrition milled slurry was centrifuged for 10 minutes at 3000 RPM. The fine suspension was retained and collected into a Nalgene bottle, while the settled material was set aside. The fine nickel oxide suspension was deposited on one side of the symmetrically porous sample of Example 3 using a 3 ml syringe and 20G1 needle. Three drops of suspension were deposited onto the center of the tri-layer sample. The sample was dried at 100° C. for 10 minutes. A commercially available anode ink (80 wt % NiO/YSZ, Fuel Cell Materials) was screen printed (EKRA, E1) on top of deposited and dried BNO using 120 mesh screen (Anrich Microscreens). The sample was annealed at 1300° C. for 2 hours.

Preparation of the electrochemical cell was completed by applying a cathode electrode to the above-described anode electrode. A strontium-doped lanthanum manganese (LSM) solution was prepared by first mixing 40 ml deionized water, 100 ml ethylene glycol (GFS Chemicals), and 20 ml $HNO_3$ (GFS Chemicals) in a 500 ml glass beaker. The following powders were added to the solution: 7.54 g $La_2(CO_3)_3$ (Rhodia), 1.31 $SrCO_3$ (Aldrich), and 5.26g $MnCO_3$ (Alchemie). The solution appeared clear after being stirred for 12 hours. The solution was transferred to and stored in a 500 ml Nalgene bottle. To confirm formation of single phase LSM material from the prepared solution, an X-ray diffraction (XRD) pattern was obtained of the material deposited on the tri-layer sample of Example 2. The solution was deposited on the tri-layers using a 3 ml syringe and 20G1 needle. Three drops were deposited on each sample. The samples were calcined at 900° C., 1000° C., and 1100° C. FIG. 7 shows the obtained XRD patterns.

Figure 16:
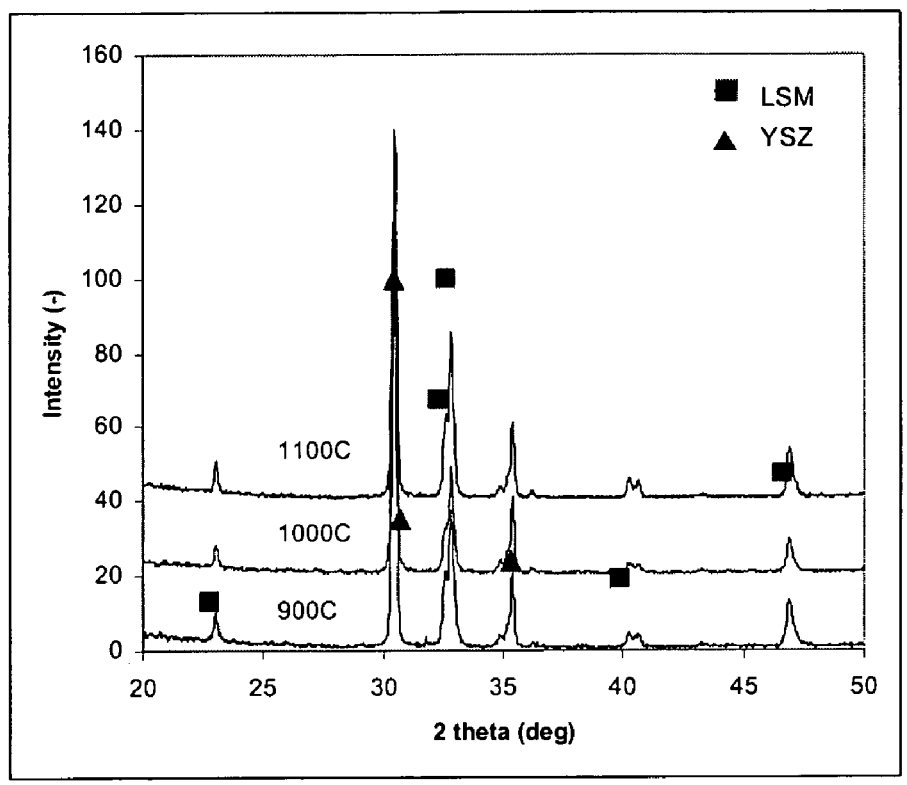
FIG. 16 is an X-ray diffraction (XRD) pattern of tri-layers infiltrated with LSM solutions and calcined at 900° C., 1000° C., and 1100° C.

The LSM solution was deposited on the tri-layer anode structure using a 3 ml syringe and 20G1 needle. Three drops of LSM solution were deposited onto the center of the tri-layer sample on the opposite face from the anode. The sample was dried at 100° C. for 10 minutes. A commercially available cathode ink (LSF, Fuel Cell Materials) was screen printed (EKRA, E1) on top of deposited and dried LSM using 120 mesh screen (Anrich Microscreens). The sample was then annealed at 975° C. for 2 hours. FIG. 16 shows the cross section of the tri-layer with complete anode and cathode.

EXAMPLE 11

Electrochemical Cell Using Tri-Layer Structure of Example 4

An anode electrode was first prepared by screen printing (EKRA, E1) a single coat of diluted commercially available anode ink (80 wt % NiO/YSZ diluted in 1:1 ratio with terpineol, Fuel Cell Materials) on top of the sintered electrolyte multi-layer structure of Example 4 using a 325 mesh screen (Anrich Microscreens). The sample was dried at 40° C. for 20 minutes. A single coat of commercially available anode ink (80 wt % NiO/YSZ, Fuel Cell Materials) was screen printed (EKRA, E1) on top of the already-printed active layer using a 120 mesh screen (Anrich Microscreens). The sample was dried at 60° C. for 10 minutes. The sample was placed electrolyte side down on a clean porous setter and the set-up was then annealed at 975° C. for 1 hour.

Preparation of the electrochemical cell was completed by applying a cathode electrode to the above-described anode electrode. A strontium-doped lanthanum manganese (LSM) solution was prepared by first mixing 40 ml deionized water, 100 ml ethylene glycol (GFS Chemicals), and 20 ml $HNO_3$ (GFS Chemicals) in a 500 ml glass beaker. The following powders were added to the solution: 7.54 g $La_2(CO_3)_3$ (Rhodia), 1.31 $SrCO_3$ (Aldrich), and 5.26 g $MnCO_3$ (Alchemie). The solution appeared clear after being stirred for 12 hours. The solution was transferred and stored in a 500 ml Nalgene bottle.

The LSM solution was deposited on the tri-layer anode using a 3 ml syringe and 20G1 needle. LSM solution was evenly deposited onto the center of the tri-layer sample on the opposite face from the anode. The sample was dried at 100° C. for 10 minutes. A diluted commercially available cathode ink (LSF/GDC diluted in 1:1 ratio with terpineol, Fuel Cell Materials) was screen printed (EKRA, E1) on top of the deposited and dried LSM using 325 mesh screen (Anrich Microscreens). The sample was dried at 40° C. in air for 20 minutes. Two coats of commercially available cathode ink (LSF-40, Fuel Cell Materials) were screen printed (EKRA, E1) on top of the already printed LSF/GDC ink using a 120 mesh screen (Anrich Microscreens). The sample was dried between each coat application at 60° C. for 10 minutes.

Figure 17:
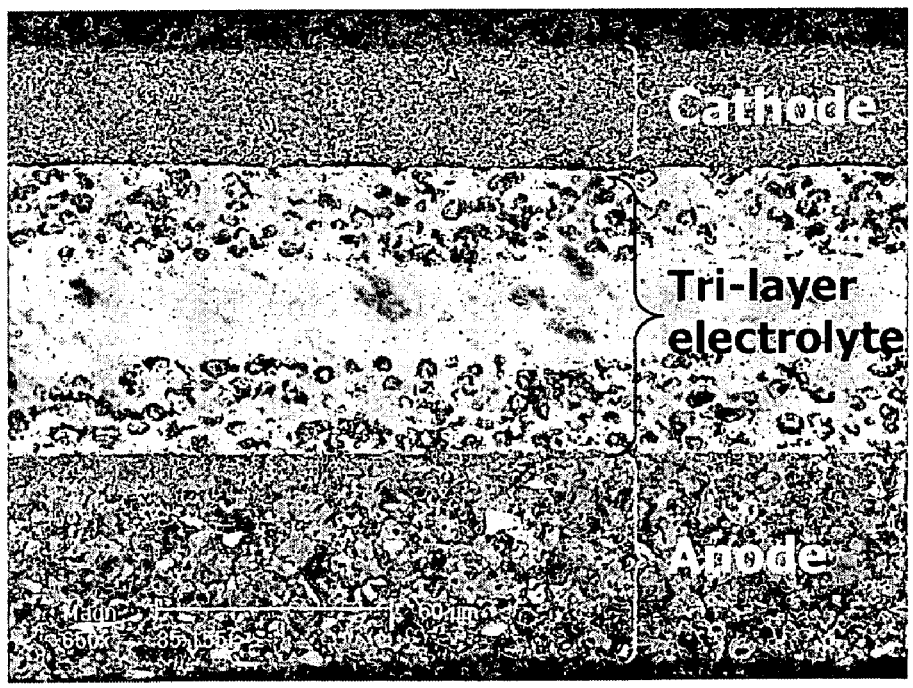
FIG. 17 is a backscatter SEM image of a cross section of the symmetrically porous tri-layer electrochemical cell of Example 10.
Figure 18:
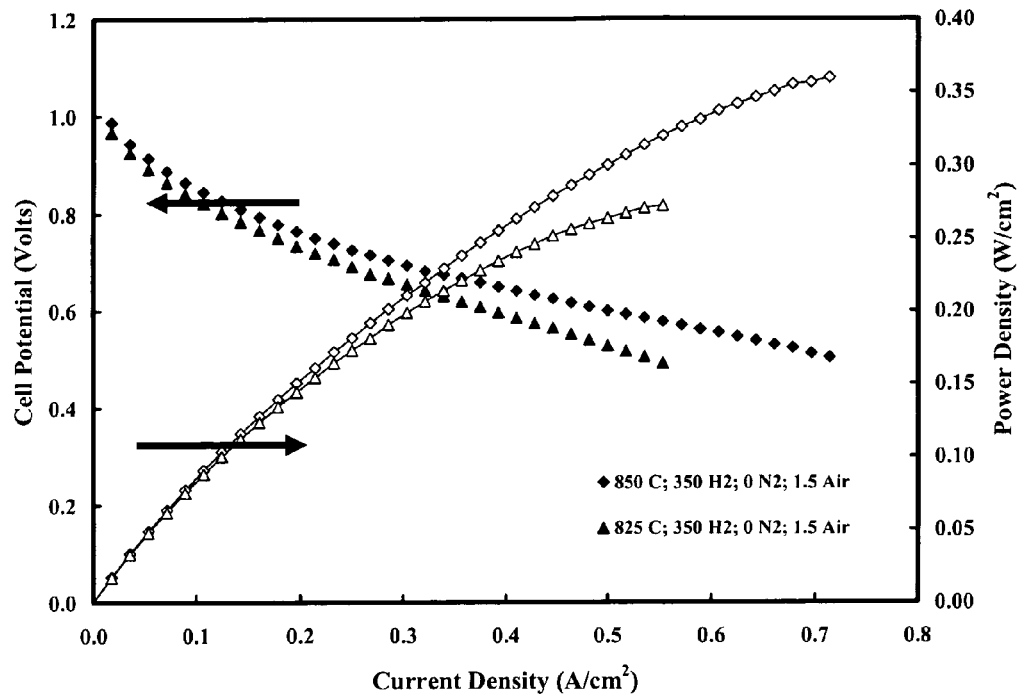
FIG. 18 is a graph showing the I-V and power density performance of the symmetrically porous tri-layer electrochemical cell of Example 11.

The electrochemical cell of Example 7 was tested to evaluate performance. The cell was heated to 825 and 850° C. to perform two sequential tests of cell performance. The cell was mounted between Inconel manifolds, which served to distribute the fuel and air gases over the respective anode and cathode sides. The manifolds also served as current collectors for the test. A current density-voltage and current density-power density curve were generated for the cell, at a fuel flow rate of 350 standard cubic centimeters of hydrogen per minute and an air flow rate of 1500 standard cubic centimeters of air per minute. The resultant curve, shown in FIG. 17, demonstrates the high power density (~0.35 W/cm$^2$) achievable with electrochemical cells of the present invention.

EXAMPLE 12

Preparation and Application of Anode and Cathode Electrodes

A single coat of diluted commercially available anode ink (80 wt % NiO/YSZ diluted in 1:1 ratio with terpineol, Fuel Cell Materials) was screen printed (EKRA, E1) on top of the sintered electrolyte multi-layer structure of Example 5 using a 120 mesh screen (Anrich Microscreens). The sample was dried at 40° C. for 20 minutes. A single coat of commercially available anode ink (80 wt % NiO/YSZ, Fuel Cell Materials) was screen printed (EKRA, E1) on top of the already-printed active layer using a 120 mesh screen (Anrich Microscreens). The sample was dried at 60° C. for 10 minutes.

Figure 19:
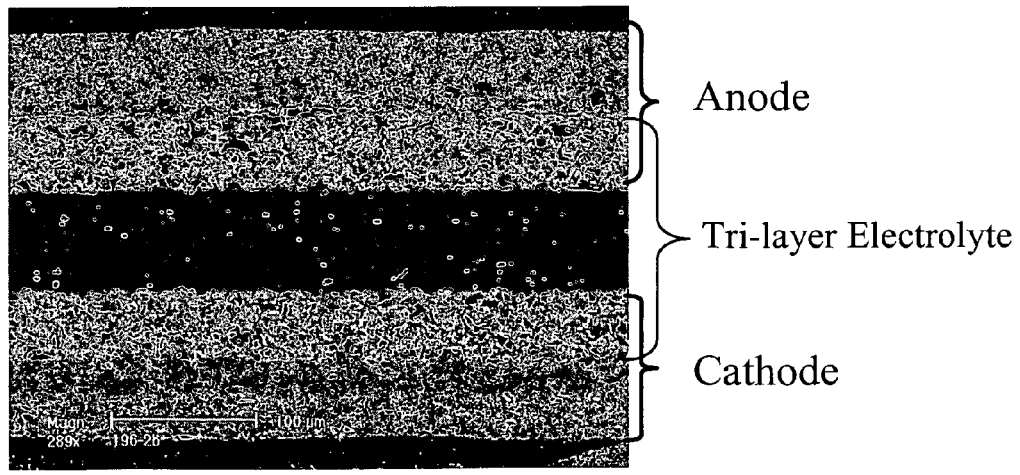
FIG. 19 is a backscatter SEM image of a cross section of the symmetrically porous tri-layer electrochemical cell of Example 12.

A single coat of diluted commercially available cathode ink (LSF/GDC diluted in 1:1 ratio with terpineol, Fuel Cell Materials) was screen printed (EKRA, E1) on the clean side of the sample already screen printed with the anode using a 120 mesh screen (Anrich Microscreens). The sample was dried at 40° C. for 20 minutes. A single coat of commercially available cathode ink (LSF, Fuel Cell Materials) was screen printed (EKRA, E1) on top of the already-printed active cathode layer using a 120 mesh screen (Anrich Microscreens). The sample was dried at 60° C. for 10 minutes. The sample was placed on a clean porous setter and the set-up was then annealed at 1000° C. for 1 hours. The annealed sample is shown in FIG. 19.

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention which is described by the following claims.

What is claimed is:

1. An electrochemical cell, consisting essentially of:
a first support layer in the form of an anode layer comprising at least one sheet of a porous ceramic electrolyte material having an anode infiltrant in the pores thereof;
an electrolyte layer comprising at least one sheet of a dense ceramic electrolyte material positioned above the anode layer; and
a second support layer in the form of a cathode layer comprising at least one sheet of the porous ceramic electrolyte material positioned above the electrolyte layer and having a cathode infiltrant in the pores thereof.

2. The electrochemical cell of claim 1, wherein
the anode infiltrant comprises a nickel oxide, a nickel oxide/yttria stabilized-zirconia, a nickel salt, a copper salt, a silver salt, a platinum salt, a gold salt, a doped alkaline earth titanate, a lanthanum chromite, nickel, copper, cobalt, silver, platinum, gold, a nickel alloy, a copper alloy, a silver alloy, a platinum alloy, a gold alloy, a doped alkaline earth titanate, a lanthanum chromite, or a mixture thereof; and
the cathode infiltrant material comprises a lanthanum manganite, a doped lanthanum manganite, a lanthanide ferrite, a lanthanide cobaltite, or a mixture thereof.

3. The electrochemical cell of claim 1, wherein the electrolyte layer has substantially the same thickness as the anode layer and the cathode layer.

4. The electrochemical cell of claim 1, wherein the dense ceramic electrolyte material and the porous ceramic electrolyte material each comprise stabilized zirconia composition.

5. The electrochemical cell of claim 4, wherein the dense ceramic electrolyte material and the porous ceramic electrolyte material each comprise scandia-doped zirconia composition.

6. The electrochemical cell of claim 5, wherein the dense ceramic electrolyte material comprises a fully stabilized scandia-doped zirconia composition and the porous ceramic electrolyte material comprises a partially stabilized scandia-doped zirconia composition.

7. The electrochemical cell of claim 5, wherein the dense ceramic electrolyte material comprises a partially stabilized scandia-doped zirconia composition and the porous ceramic electrolyte material comprises a fully stabilized scandia-doped zirconia composition.

8. The electrochemical cell of claim 1, wherein the dense ceramic electrolyte material comprises a stabilized zirconia composition and the porous ceramic electrolyte material comprises a stabilized ceria composition.

9. The electrochemical cell of claim 1, wherein the anode layer ceramic electrolyte material and the cathode layer ceramic electrolyte material each have a pore volume greater than 50% of the total geometric volume.

10. The electrochemical cell of claim 1, wherein the anode layer ceramic electrolyte material and the cathode layer ceramic electrolyte material each have a pore volume greater than 20% and less than 50% of the total geometric volume.

11. The electrochemical cell of claim 1, wherein the anode layer ceramic electrolyte material and the cathode layer ceramic electrolyte material each have an average pore size between 100 nanometers and 200 microns.

12. The electrochemical cell of claim 1, wherein a ratio of the thickness between the anode layer and the electrolyte layer ranges from about 6:1 to about 1:1.

13. The electrochemical cell of claim 1, wherein a ratio of the thickness of the cathode layer to the electrolyte layer ranges from about 6:1 to about 1:1.

14. The electrochemical cell of claim 1, wherein a ratio of the thickness of the anode layer to the electrolyte layer ranges from about 6:1 to about 1:1 and a ratio of the thickness of the cathode layer to the electrolyte layer ranges from about 6:1 to about 1:1.

15. The electrochemical cell of claim 1, wherein the anode layer and the cathode layer are each at least 28 μm in thickness.

16. The electrochemical cell of claim 15, wherein the electrolyte layer is at least 50 μm in thickness.

17. An electrochemical cell stack, comprising:
a first dense electronically conductive plate comprising a nickel chrome superalloy or a ferritic stainless steel;

a first electrochemical cell of claim 1 having an outer surface secured to the first conductive plate;

a second dense electronically conductive plate secured to the opposing outer surface of the first electrochemical cell;

a second electrochemical cell of claim 1 having an outer surface secured to the opposing surface of the second conductive plate; and a third dense electronically conductive plate secured to the opposing outer surface of the second electrochemical cell.

18. The electrochemical cell stack of claim 17, wherein the anode infiltrant comprises a nickel oxide, a nickel oxide/yttria stabilized-zirconia, a nickel salt, a copper salt, a silver salt, a platinum salt, a gold salt, a doped alkaline earth titanate, a lanthanum chromite, nickel, copper, cobalt, silver, platinum, gold, a nickel alloy, a copper alloy, a silver alloy, a platinum alloy, a gold alloy, a doped alkaline earth titanate, a lanthanum chromite, or a mixture thereof; and the cathode infiltrant material comprises a lanthanum manganite, a doped lanthanum manganite, a lanthanide ferrite, a lanthanide cobaltite, or a mixture thereof.

19. An electrochemical cell stack, comprising:

n electrochemical cells of claim 1, wherein n>2; and n+1 dense electronically conductive plates comprising a nickel chrome superalloy or a ferritic stainless steel;

wherein each of n−1 plates is secured between a surface of the anode layer of one of the n electrochemical cells and a surface of the cathode layer of another one of the n electrochemical cells and each of the remaining 2 plates is secured to an outer surface of one of the outermost of the n electrochemical cells.

20. The electrochemical cell stack of claim 19 wherein the anode infiltrant comprises a nickel oxide, a nickel oxide/yttria stabilized-zirconia, a nickel salt, a copper salt, a silver salt, a platinum salt, a gold salt, a doped alkaline earth titanate, a lanthanum chromite, nickel, copper, cobalt, silver, platinum, gold, a nickel alloy, a copper alloy, a silver alloy, a platinum alloy, a gold alloy, a doped alkaline earth titanate, a lanthanum chromite, or a mixture thereof; and the cathode infiltrant material comprises a lanthanum manganite, a doped lanthanum manganite, a lanthanide ferrite, a lanthanide cobaltite, or a mixture thereof.

21. A method of making an electrochemical cell stack, comprising the steps of:

providing n electrochemical cells of claim 1, wherein n>2;

providing n+1 dense electronically conductive plates comprising a nickel chrome superalloy or a ferritic stainless steel;

securing each of n−1 plates between a surface of the anode layer of one of the n electrochemical cells and a surface of the cathode layer of another one of the n electrochemical cells;

securing each of the remaining 2 plates to an outer surface of one of the outermost of the n electrochemical cells; and heating the layered assembly to the operating temperature of the electrochemical cells.

22. The method of claim 21, wherein:

the anode infiltrant comprises a nickel oxide, a nickel oxide/yttria stabilized-zirconia, a nickel salt, a copper salt, a silver salt, a platinum salt, a gold salt, a doped alkaline earth titanate, a lanthanum chromite, nickel, copper, cobalt, silver, platinum, gold, a nickel alloy, a copper alloy, a silver alloy, a platinum alloy, a gold alloy, a doped alkaline earth titanate, a lanthanum chromite, or a mixture thereof; and the cathode infiltrant material comprises a lanthanum manganite, a doped lanthanum manganite, a lanthanide ferrite, a lanthanide cobaltite, or a mixture thereof.

23. An electrochemical cell, comprising:

a first support layer in the form of an anode layer comprising at least one sheet of a porous ceramic electrolyte material having an anode infiltrant in the pores thereof;

an electrolyte layer comprising at least one sheet of a dense ceramic electrolyte material positioned above the anode layer; and a second support layer in the form of a cathode layer comprising at least one sheet of the porous ceramic electrolyte material positioned above the electrolyte layer and having a cathode infiltrant in the pores thereof, wherein the anode layer and the cathode layer are each at least 28 µm in thickness and the electrolyte layer is at least 50 µm in thickness, the electrolyte layer being sufficiently supported by the anode layer and the cathode layer to provide mechanical integrity for the electrochemical cell.

24. The electrochemical cell of claim 23, wherein the anode layer and the cathode layer are each not greater than 340 µm in thickness.

25. The electrochemical cell of claim 23, wherein the electrolyte layer is not greater than 100 µm in thickness.

26. An electrochemical cell, comprising:

a first support layer in the form of an anode layer comprising at least one sheet of a porous ceramic electrolyte material having an anode infiltrant in the pores thereof;

an electrolyte layer comprising at least one sheet of a dense ceramic electrolyte material positioned above the anode layer; and a second support layer in the form of a cathode layer comprising at least one sheet of the porous ceramic electrolyte material positioned above the electrolyte layer and having a cathode infiltrant in the pores thereof, wherein the electrolyte layer is sufficiently supported by the anode layer and the cathode layer to provide mechanical integrity for the electrochemical cell.

* * * * *